May 29, 1956  A. STOSUY  2,747,261

BEARING AND METHOD OF MAKING SAME

Filed May 28, 1952

INVENTOR.
ATHAN STOSUY
BY

United States Patent Office 2,747,261
Patented May 29, 1956

2,747,261

BEARING AND METHOD OF MAKING SAME

Athan Stosuy, Dayton, Ohio, assignor to General Motors Corporation, Detroit, Mich., a corporation of Delaware Application May 28, 1952, Serial No. 290,426

3 Claims. (Cl. 29—191.2)

This invention relates to bearings and to methods for making such bearings.

The main object of the invention is to provide a bearing and method of making same wherein an iron bearing surface is provided bonded to steel wherein the iron includes combined carbon and is bonded together by an iron phosphorous eutectic mixture.

Another object of the invention is to provide an anti-friction bearing including a steel backing member having coextensively bonded thereto an anti-galling bearing facing consisting of a sintered and rolled layer of porous ferrous material including from .25% to 1.25% phosphorous and from .60% to .80% combined carbon.

Another object of the invention is to provide a method for making a bearing of the type described wherein a mixture of ferrous powder, graphite and phosphorous, or phosphorous containing material, in desired quantities, is spread in a substantially uniform layer upon the surface of a steel sheet. The assembly is then heated under controlled conditions of time, temperature and atmosphere for cohering together the particles of the ferrous material and for bonding said particles to the surface of the steel sheet. The bonded material is then rolled to from 33% to 66% of its original thickness to densify the layer and is then given a second heat treatment under controlled conditions of time, temperature and atmosphere for further consolidating the layer and for forming an iron phosphorous eutectic together with combined carbon within predetermined limits. The material is then formed into bearings.

Further objects and advantages of the present invention will be apparent from the following description, reference being had to the accompanying drawing, wherein preferred embodiments of the present invention are clearly shown.

Figure 1:
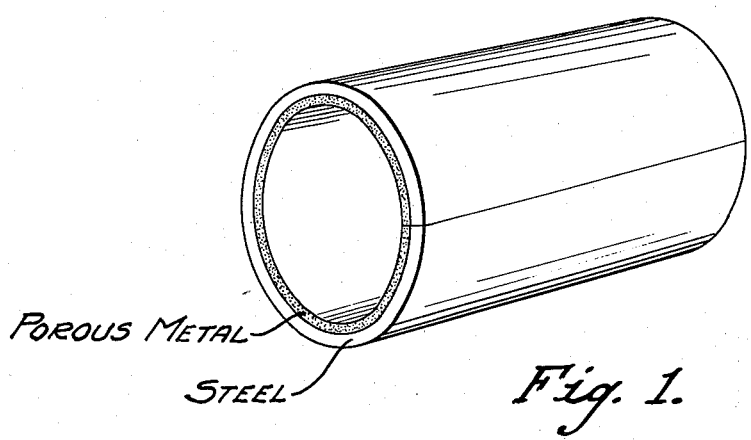
Fig. 1 is a perspective view of a cylindrical bearing made from rolled up sheet stock.
Figure 2:
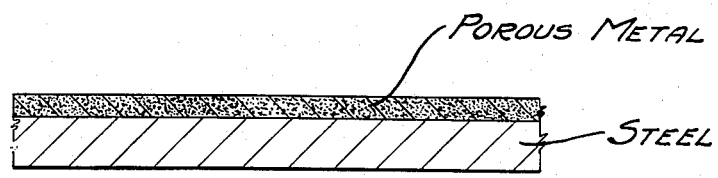
Fig. 2 is a cross sectional view through a portion of the sheet stock used in the manufacture of bearings as described herein.

In Lenel Patent 2,226,520, assigned to the assignee of the present invention, a disclosure is made concerning the addition of phosphorous in various physical forms to carbon free iron powder as a means for forming iron articles, after sintering, having exceptionally good physical properties.

The phosphorous is suggested as an addition because of the formation of an iron phosphorous eutectic during sintering, which eutectic is particularly useful as a bonding agent. In this patent, phosphorous in the final article is limited to within the range of .25% to 2.5%. Further, the patent suggests the addition of phosphorous in a number of forms such as elemental phosphorous and preferably ferro-phosphorous.

I have found that iron, carbon, phosphorous mixtures in sintered and rolled form, wherein the percentages of carbon and phosphorous are controlled within narrow ranges, present an excellent anti-galling material. This material is well adapted for use in bearings and the like since it has high resistance against crush, suitable porosity for adequate lubrication, and excellent bearing properties when run against the usual steel shaft. The peculiar nature of the material prevents noticeable wear so that a bearing made from this material is a long-lasting element which maintains critical bearing clearances over extended periods of use.

The bearing properties of the material may be modified through the use of alloying ingredients in the initial mixture to be sintered. Such elements as copper, nickel, chromium, tin, etc., or mixtures thereof in quantities not to exceed 10% by weight of the iron may be used. The physical characteristics may be controlled by the utilization of carbon and phosphorous within desired limits.

Specifically, I prefer a mixture which yields a final sintered product containing combined carbon within the range of .60% to 80% and phosphorous within the range of .25% to 1.25%, it being understood throughout this disclosure and in the claims to follow that in addition to these ingredients, alloying ingredients as above mentioned may be included in the bearing.

One example in the manufacture of such a bearing, comprehends the use of sponge iron powder having a mesh size of 100 or 150 mixed with 2% graphite and about 4% ferro phosphorous powder. This mixture is spread in a substantially uniform layer upon the surface of a steel strip which has preferably been copper plated (flash plate). The assembly is heated to a temperature of from 1900° F. to 2000° F. for a period in the order of twenty minutes. During this period, the adjacent particles of iron cohere together and likewise bond to the surface of the steel strip to form a highly porous layer thereon. During this heating step the carbon may also be diffused into the iron in accordance with the temperature used. The sintered sheet is next rolled at relatively high rolling pressures to reduce the thickness of the sintered layer about 60%, for example, if the original layer of metal powder used is .45" thick, the sintered and rolled layer of porous metal will be in the order of .020" thick.

This sintered and rolled material is then given a second heat treatment at a higher temperature in the order of 2030° F. for about twenty to thirty minutes for further consolidating the layer, forming an iron phosphorous eutectic and for completing the carbon diffusion. The material now presented is a closely knit, strong, reasonably ductile bearing layer of moderate porosity. This sheeted material may then be suitably cut and rolled into semi-cylindrical or cylindrical bearings as desired or it may be used as a thrust surface in flat form.

It is understood that all of the heating steps noted above are carried out under controlled conditions of atmosphere so as to prevent oxidation and to enhance bonding and alloying between the powders in the mixture. For this purpose, non-oxidizing or reducing atmospheres are preferred.

The final product from this example will include about 1% phosphorous with a .60% to .80% combined carbon. This is explained by the fact that the 4% ferro phosphorous initially used contained approximately 25% phosphorous so that the final sintered mixture only contains about 1% phosphorous. The percentage of phosphorous in ferro phosphorous varies according to the source and therefore it is suggested that trial runs be made in order to determine the correct quantity of ferro phosphorous to be used in the initial powder mixture in order to obtain the desired percentage phosphorus in the final product.

With respect to the carbon content, it will be noted that 2% graphite was added in the initial mixture which yielded a .60% to .80% combined carbon. This reduction in carbon is explained by the fact that the usual iron powder, whether it be sponge iron, iron from reduced iron oxide, electrolytic iron, etc., generally includes small quantities of iron oxide as a residual impurity. Certain of the carbon or graphite used in the initial mix is taken up in reducing this oxide and therefore it is again suggested that a trial run be made with any specific iron powder in order to determine the excess graphite required in order to reduce the residual oxide so that a desired quantity of combined carbon will be present in the final article.

The percentage reduction in thickness of the sintered layer after the first heat treatment step should be at least 33%. The second heating step should be at a temperature in excess of the temperature used during the first heating step to assure full consolidation and diffusion. The percentage carbon in combined form may range from .40% to .90% according to the specific use of the bearing while the percentage phosphorus may vary from .25% to 1.25%, it being understood that percentages of phosphorus over this figure cause excessive brittleness in the material which makes it unsuitable for most bearing purposes. The success of the material resides in the excellent anti-galling properties of the iron-phosphorus eutectic with combined carbon. This ingredient is known metallurgically as "steadite."

While the embodiments of the present invention as herein disclosed, constitute preferred forms, it is to be understood that other forms might be adopted.

What is claimed is as follows:

1. A bearing comprising a steel backing member and an anti-friction facing having good anti-galling properties coextensively bonded thereto, said facing consisting of a sintered and rolled layer of porous ferrous material including phosphorus in quantities of from .25% to 1.25% together with combined carbon in quantities of from .40% to .90%.

2. A bearing comprising a steel backing member and an anti-friction facing having good anti-galling properties coextensively bonded thereto, said facing consisting of a sintered and rolled layer of porous ferrous material including phosphorus in quantities of from .50% to 1.0% together with combined carbon in quantities of from .60% to .80%.

3. In the method for making composite bearing material, the steps comprising uniformly distributing a layer of metal powder including iron as a major constituent together with phosphorus and carbon upon the surface of a steel sheet wherein the phosphorus and carbon are in quantities sufficient to yield between .25% and 1.25% and .40% to .90%, respectively, of phosphorus and combined carbon in the completed bearing, heating said sheet with the metal powder thereon under suitable conditions of time, temperature and atmosphere so as to cohere the metal powder layer together and coextensively bond it to the steel for forming a composite article wherein the temperature is below that temperature which will cause complete diffusion of the carbon and phosphorus, rolling said article to reduce the thickness of the metal powder layer to between 33% to 66% of its original thickness, then forming an iron phosphorus eutectic together with combined carbon by heating the composite article at a temperature in excess of the temperature of the first heating step.

References Cited in the file of this patent

UNITED STATES PATENTS

| | | |
|---|---|---|
| 2,190,237 | Koehring | Feb. 13, 1940 |
| 2,213,523 | Jones | Sept. 3, 1940 |
| 2,260,247 | Darby et al. | Oct. 21, 1941 |
| 2,341,732 | Marvin | Feb. 15, 1944 |
| 2,349,266 | Hartley | May 23, 1944 |
| 2,377,882 | Hensel | June 12, 1945 |
| 2,419,691 | Shafer | Apr. 29, 1947 |